United States Patent
Li et al.

(10) Patent No.: US 6,951,627 B2
(45) Date of Patent: Oct. 4, 2005

(54) METHOD OF DRILLING HOLES WITH PRECISION LASER MICROMACHINING

(75) Inventors: Ming Li, Chelmsford, MA (US); Makoto Ishizuka, Belmont, MA (US); Xinbing Liu, Acton, MA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 191 days.

(21) Appl. No.: 10/329,036

(22) Filed: Dec. 24, 2002

(65) Prior Publication Data

US 2003/0201578 A1 Oct. 30, 2003

Related U.S. Application Data

(60) Provisional application No. 60/375,741, filed on Apr. 26, 2002.

(51) Int. Cl.[7] ............................ B23K 26/03; B23K 26/06
(52) U.S. Cl. .............. 264/400; 219/121.67; 219/121.71; 219/121.74; 219/121.75; 219/121.83; 219/121.85
(58) Field of Search ........................ 219/121.67–121.75, 219/121.83, 121.85; 264/400

(56) References Cited

U.S. PATENT DOCUMENTS

| | | | |
|---|---|---|---|
| 5,268,919 A | 12/1993 | Hongu et al. | |
| 5,296,673 A | 3/1994 | Smith | |
| 5,310,986 A | * 5/1994 | Zumoto et al. | ........... 219/121.7 |
| 5,417,897 A | 5/1995 | Asakawa et al. | |
| 5,532,873 A | 7/1996 | Dixon | |
| 5,556,395 A | 9/1996 | Shimmick et al. | |
| 5,706,305 A | 1/1998 | Yamane et al. | |
| 5,744,780 A | 4/1998 | Chang et al. | |
| 5,933,218 A | * 8/1999 | Matsubara et al. | ............ 355/67 |
| 5,973,290 A | * 10/1999 | Noddin | ...................... 219/121.7 |
| 6,008,914 A | 12/1999 | Sasagawa et al. | |
| 6,058,127 A | 5/2000 | Joannopoulos et al. | |
| 6,120,976 A | * 9/2000 | Treadwell et al. | ........... 430/322 |
| 6,150,630 A | 11/2000 | Perry et al. | |
| 6,211,485 B1 | 4/2001 | Burgess | |
| 6,260,388 B1 | 7/2001 | Borrelli et al. | |
| 6,574,024 B1 | 6/2003 | Liu | |
| 2002/0164678 A1 | 11/2002 | Ganser et al. | |

FOREIGN PATENT DOCUMENTS

| | | |
|---|---|---|
| JP | 362057788 A | 3/1987 |
| JP | 401289586 A | 11/1989 |
| JP | 410048529 A | 2/1998 |
| JP | 411079791 A | 3/1999 |
| JP | 2000-176669 | * 6/2000 |

OTHER PUBLICATIONS

Ming Li et al., "Nanosctructing In Submicron–Level Waveguides with Femtosecond Laser Pulses" Optics Commmunicatios (2002), pp. 1–5 (Sep. 10, 2002).

Ming Li et al., "Femtosecond Laser Micromachining of Si–on–$SiO_2$ for Photonic Band Gap Crystal Fabrication", Jpn. J. Appl. Phys. vol. 40 (2001), pp. 3476–3477, Part I, No. 5A, May 2001..

* cited by examiner

Primary Examiner—Stefan Staicovici
(74) Attorney, Agent, or Firm—RatnerPrestia

(57) ABSTRACT

The invention is an apparatus and a method for drilling holes in a work piece with a laser. A laser beam is received by the optical system and directed along an optical path. The system directs the laser beam through a moveable mask aperture creating a sub-beam, that is reduced in size by a lens system as it is imaged onto a work piece. Multiple features are formed in the work piece by moving the mask.

8 Claims, 4 Drawing Sheets ical Application No. 60/375,741 filed on Apr. 26, 2002, the contents of which are incorporated herein by reference.

METHOD OF DRILLING HOLES WITH PRECISION LASER MICROMACHINING

CROSS REFERENCE TO RELATED APPLICATION

This application claims the benefit under Title 35 U.S.C. § 119(e) of U.S. Provisional Application No. 60/375,741 filed on Apr. 26, 2002, the contents of which are incorporated herein by reference.

FIELD OF THE INVENTION

The present invention relates to precision laser micromachining. More specifically, it relates to a method of and a system for laser micromachining to obtain precise alignment of drilling laser beams and for fabricating products, having sub-micron features, with precision and accuracy. One embodiment may be used to fabricate photonic devices such as photonic crystals.

BACKGROUND OF THE INVENTION

Photonic devices and microphotonics provide exciting potential for furthering the advancement of technology historically served by microelectronics. Photonic devices may be used as frequency selection filters to enable large volumes of data to travel along optical fibers and to be routed to their final destinations. As light traveling in a fiber is incident upon a frequency selection photonic crystal, the light at the desired wavelength travels through the photonic crystal and is routed to its destination, while the light at all other frequencies is reflected. Currently, photonic crystals are commonly manufactured with layered GaAs and AlGaAs or layered Si and $SiO_2$. Microphotonic devices are expected to replace microelectronic devices once cost-effective methods of manufacturing photonic devices are developed. One reason that optical circuits have not been widely implemented is that there are manufacturing problems related to making photonic devices meet index of refraction specifications.

Lasers may be used to drill holes in or otherwise machine a work piece, including, glass or silicon or other dielectric materials to form waveguides or microoptical structures in the materials. The behavior of light in a photonic crystal may be better understood by analogy to the behavior of electricity in a conventional crystal. Crystals are characterized by a periodic arrangement of atoms or molecules. The lattice of atoms or molecules may introduce gaps in the energy band structure of the crystal through which electrons cannot propagate. A photonic crystal is a lattice of discontinuities in the refractive index of a material. One example is a lattice of holes in a waveguide. If the dielectric constants of the waveguide material and the material in the holes is sufficiently different, light is substantially confined by the interfaces. Scattering of the light at the interfaces can produce many of the same effects for photons as are produced for electrons by the lattice of atoms or molecules.

Photonic crystal fabrication precisely aligns the holes that constitute the photonic crystal in the described lattice structure. Current laser micromachining methods, such as direct writing, do not provide a way to drill features with the sub-micron accuracy and precision needed for photonic crystals. This is because it is difficult to accurately align the laser beam or to produce multiple holes positioned in the desired lattice arrangement with an accuracy that is desirable to produce an effective photonic structure. The current method of producing holes (single and multiple holes) uses a moveable work piece holder on which a photonic crystal is mounted. The laser beam is aligned at the desired location(s) on the crystal by maintaining the laser beam in a single location and moving the work piece holder with the work piece mounted onto it. The problem is that the holder cannot be moved with a level of accuracy suitable for manufacturing photonic crystals. In addition to the spatial positioning errors, photonic structures may also suffer from blurring of the image of the laser beam as the feature sizes decrease to less than or equal to the size of the wavelength of the beam. What is needed is a way to mass manufacture a photonic crystal within specifications, including a way to align the beam and work piece in a laser drilling system for drilling holes in a photonic crystal where the feature size is less than or equal to the wavelength of the drilling laser beam.

SUMMARY OF THE INVENTION

The invention is embodied in an apparatus and a method for drilling holes in a work piece with a laser. A laser beam is received by the optical system and directed along an optical path. The system directs the laser beam through a moveable mask aperture creating a sub-beam that is reduced in size by a lens system as it is imaged onto a work piece. Multiple features are formed in the work piece by moving the mask.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION OF THE INVENTION

The present invention provides a way to mass manufacture photonic crystals having feature sizes less than or equal to the wavelength of the laser beam used in the manufacturing process. The present invention also provides a way to improve beam stability within a laser drilling system. Furthermore, the present invention provides a way to align the beam and work piece in a laser drilling system to enable drilling holes in a photonic crystal. The present invention may be used to create a very dense pattern of sub-micron features.

The present invention also provides a way to drill features with a laser drilling system where the feature size is less than or equal to the wavelength of the drilling laser beam. In addition, the present invention provides a way to increase throughput of a laser drilling system by parallel processing with sub-beams created by a multiple aperture mask.

Figure 1:
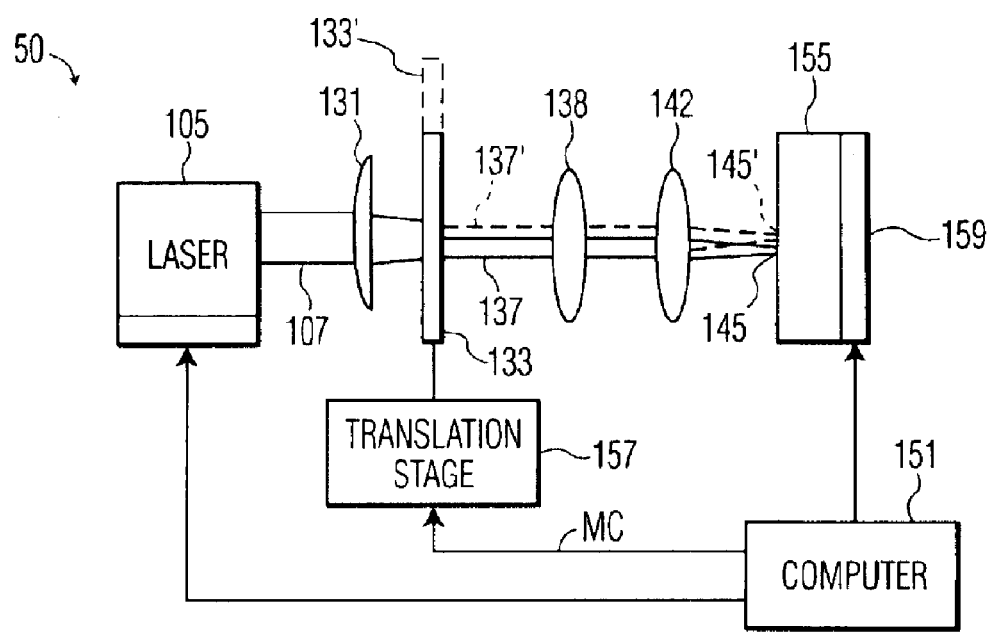
FIG. 1 is a block diagram of a first exemplary embodiment of the invention.

FIG. 1 is a block diagram of a first exemplary embodiment of the invention. It shows a laser drilling system 50 which positions the light of a laser beam from an ultrafast laser 105 on a work piece 155 for laser machining. Light means any energy that may be generated by a laser. The system 50 includes a laser 105 which generates a laser beam 107.

In the exemplary embodiment, ultrafast laser 105 may be a conventional femtosecond laser with Ti: Sapphire crystal, such as a Clark-MXR 2000. In another embodiment, laser 105 may be a picosecond laser. As used herein, the term "ultrafast laser" includes both femtosecond and picosecond lasers. Because the energy across the wavefront exhibits a Gaussian distribution, an ultrafast laser is capable of producing a feature having a size that is smaller than the spot-size, produced by the laser wavefront. In one example described by Li et al. in Jap. J. Appl. Phys. 40 (2001), pp. 3476–3477, a laser beam with a 387 nm wavelength was used to drill features having a size of approximately 160 nm. In an exemplary embodiment of the present invention, laser beam 107 may have a pulse width of 150 fs, a wavelength of 775 nm, a pulse repetition rate of 330 Hz, and a pulse energy of 880 micro-Joules. In an alternative embodiment, laser beam 107 may have a 387 nm wavelength. In all of these embodiments, the work piece was exposed to fluence greater than the ablation threshold only over a central portion of the wavefront. In other embodiments, the laser beam may have other pulse widths, wave lengths, pulse repetition rates, and pulse energy appropriate for the desired machining task.

When laser beam 107 exits laser 105, it travels along the optical path until it is incident upon lens 131 which expands laser beam 107. In an alternative embodiment, the laser beam 107, as it exits laser 105, is already wider than the hole in mask 133 and expander lens 131 may not be used. In yet another alternative embodiment, lens 131 may be a conventional lens that focuses beam 107 beyond the location of aperture 135 so that less laser energy is wasted when it is masked by aperture 135. Accordingly, an expander lens is an optional feature of the embodiment shown in FIG. 1. Expanded laser beam 107 exits lens 131 and propagates until it is incident upon mask 133. In one exemplary embodiment, mask 133 may have a single aperture. In another embodiment, mask 133 may have multiple apertures. Regardless of whether expander lens 131 is used, the laser beam that is incident upon mask 133 desirably has a wavefront cross-section with an area greater than the size of the aperture in mask 133. Mask 133 is mounted on translation stage 157, which can be a one direction stage in the X direction or a two direction stage in the X and Y directions. In the exemplary embodiments, the X direction is into or out of the plane of the paper and the Y direction is up or down on the paper. Mask 133 masks a portion of laser beam 107 and creates sub-beam 137.

After sub-beam 137 exits mask 133, it is incident upon "eyepiece lens" 138 and microscope objective lens 142 which focus a reduced-size image 145 of mask 133 in sub-beam 137 on work piece 155. In an exemplary embodiment, the combination of two lenses, 138 and 142, may create a demagnification, for example, of thirty upon work piece 155. Thus, the size of the image 145 of the mask 133 on the work piece is $1/30^{th}$ the size of the image at mask 133. This demagnification of thirty means that image 145 is moved one-thirtieth of the distance that mask 133 is moved. In one example, therefore, when aperture 133 is moved 1 mm, image 145 moves 33 microns (1 mm/30=33 microns) along the surface of work piece 155. One benefit of this de-magnification is that any translation errors made by translation stage 157 in moving aperture 133 are reduced by a factor of thirty when image 145 is incident upon work piece 155. In other embodiments, lenses of different magnification may have other focal lengths. Work piece 155 is mounted on translation stage 159 which may be an XYZ translation stage movable in any of the X, Y and Z directions. A computer 151 controls the movement of both translation stages 157 and 159. Computer 151 also controls laser 105 by turning it on and off as needed.

Under the control of computer 151, ultrafast laser 105 is turned on, causing laser beam 107, sub-beam 137, and image 145 to be created. Image 145, through sub-beam 137, ablates work piece 155 to drill a hole in it. After the hole is drilled, computer 151 turns off laser 105. If another hole is to be drilled in work piece 155, computer 151 directs translation stage 157 to move the mask 133. Depending upon whether translation stage is an X direction or an XY direction stage, computer 151 may cause mask 133 to be moved in the X direction and/or the Y direction. Computer 151 then turns on laser 105 again. The movement of mask 133 to a new position causes image 145, through sub-beam 137, to be moved to a new position 137' and further causes image 145 to be moved to a new position 145' on work piece 155. The image 145' of mask 133, through sub-beam 137', ablates work piece 155 by drilling a second hole. Computer 151 then turn off laser 105. This procedure is followed until all of the holes of the pattern have been drilled.

In the exemplary embodiment of the invention, translation stage 159 does not move the work piece while it is being machined. Instead, stage 159 is used to position the work piece relative to beams 137, 137' before the machining operation begins.

Figure 2:
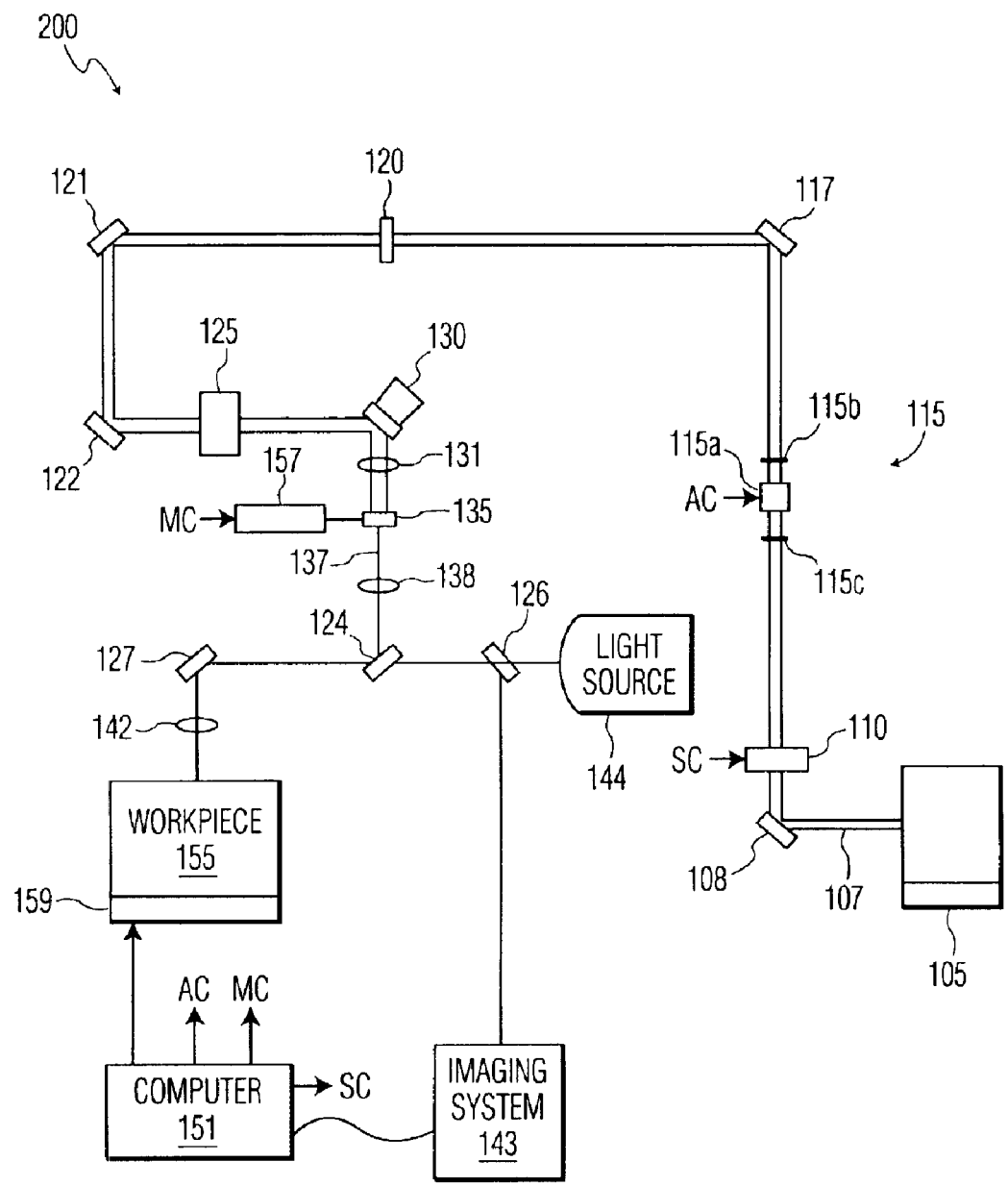
FIG. 2 is a block diagram of a second exemplary embodiment of the invention using a single aperture mask.

FIG. 2 is a block diagram of a second embodiment of a drilling system 200. The system 100 includes a laser 105 which generates a laser beam 107 with a wavelength of 775 nm. In an alternative embodiment, the wavelength of laser beam 107 may be 387 nm. In such an alternative embodiment, the other characteristics of the system may be adjusted accordingly. Laser beam 107 travels along an optical path until it is incident upon first mirror 108. First mirror 108 is a conventional laser mirror having a high reflectivity at least at the wavelength of the laser beam 107. In this exemplary embodiment, first mirror 108 is highly reflective of 775 nm wavelength light. First mirror 108 redirects beam 107 along an optical path where it is incident upon shutter 110 which opens and closes to selectively illuminate work piece 155. Shutter 110 is a conventional laser shutter used to control the propagation of laser beam 107. In an exemplary embodiment, shutter 110 is an electric shutter controlled by a shutter control signal, SC, provided by computer 151. In another embodiment, shutter 110 may be controlled by timing electronics (not shown) that start and stop the propagation of laser beam 107 along the optical path. In yet another embodiment, shutter 110 may be operated directly by an operator using manual controls.

Laser beam 107 exits shutter 110 and propagates along the optical path to attenuator 115 which filters the energy in laser beam 107 in order to precisely control the ablation parameters. Attenuator 115 is a high-dynamic, high-precision, variable attenuator. In an exemplary embodiment, attenuator 115 is a half wave plate 115a between two crossed polarizers 115b and 115c. In the exemplary embodiment, the half-wave plate 115a is rotated responsive to an attenuator control signal, AC, provided by the computer 151 to achieve the desired level of attenuation.

Laser beam 107 exits attenuator 115 and propagates along the optical path until it is incident upon second mirror 117 which redirects the beam to a nonlinear optical medium for harmonic generation 120, which in an exemplary embodiment, may be a frequency doubler. Second mirror 117 is a conventional laser mirror which is highly reflective of at least the 775 nm wavelength light. Exemplary frequency doubler 120 halves the wavelength of laser beam 107. In an exemplary embodiment, frequency doubler 120 is a Beta-Barium Borate (BBO) crystal which receives the 775 nm beam 107 and transforms it into a beam having a wavelength of 387.5 nm. In alternative embodiments, a different nonlinear optical medium for harmonic generation may be used, such as a frequency tripler or a frequency quadrupler. Using frequency doubler 120 to provide a shorter wavelength beam allows laser drilling system 100 to drill holes having a smaller feature size than could be drilled using a longer wavelength beam. Additionally, the increased energy of photons in a beam with a shorter wavelength causes work piece 155 to ablate more easily.

Laser beam 107, at a reduced wavelength, exits frequency doubler 120 and propagates along the optical path until it is incident upon third mirror 121. In an exemplary embodiment, third mirror 121 is a harmonic mirror that reflects a specific wavelength of light. In an exemplary embodiment, third mirror 121 preferentially reflects light having a 387.5 nm wavelength, allowing light at longer wavelengths (e.g. 775 nm) to pass through the mirror. Third mirror 121 redirects laser beam 107 along the optical path until it is incident upon fourth mirror 122 which, in turn, redirects the beam to where it is incident upon quarter-wave plate 125. In an exemplary embodiment, fourth mirror 122 is also a harmonic mirror that preferentially reflects a light having a 387.5 nm wavelength. Quarter-wave plate 125 changes the polarization of the laser beam from linear to circular, thereby improving the shape of the final ablation in work piece 155. Circularly polarized light from quarter wave plate 125 is provided to a PZT scan mirror 130.

In an alternative embodiment, second mirror 117, frequency doubler 120, third mirror 121, and quarter-wave plate 125 may be eliminated. In such an embodiment, the wavelength of laser beam would not be shortened by frequency doubler 120 and the light would be transmitted from attenuator 115 to PZT scan mirror 130.

As described above, the intensity of the wavefront of a laser beam can be modeled as a two-dimensional Gaussian distribution, with the highest intensity at the center of the beam and lower intensities toward the edge of the beam. For laser drilling with projection imaging, a uniform laser intensity distribution at the work piece is desired so that the drilled holes are uniform. One way of insuring uniform illumination of the mask is to transform the beam to have a more uniform transverse intensity distribution before illuminating the mask. The process of transforming the laser beam is known as beam homogenization or beam shaping.

In the exemplary embodiment, PZT scan mirror 130 performs the beam homogenization. It move; as needed to guide laser beam 107 through aperture 135. In an exemplary embodiment, PZT scan mirror 130 is a conventional PZT scan mirror such as a Piezo Jena which is highly reflective of at least the 387.5 nm wavelength light. It homogenizes the beam by scanning the center of laser beam 107 across the mask, for example, in a circular pattern, to keep the fluence of laser beam 107 at the work piece consistent when the aperture 135 is in any position. In another embodiment, where frequency doubler 120 is eliminated, PZT scan mirror 130 may be selected to be highly reflective of at least the 775 nm wavelength light. An exemplary laser beam homogenization system is described in U.S. Pat. No. 6,574,024 entitled LASER BEAM HOMOGENIZATION BY SCANNING A BEAM ONTO A MASK owned by Matsushiva Electric Industrial Co., Ltd.

PZT scan mirror 130 redirects laser beam 107 until it is incident upon lens 131 which focuses laser beam 107 beyond aperture 135 so that the beam is defocused at the aperture 135. As described above, this lens may also expand the beam on the mask 135. Laser beam 107 exits lens 131 and propagates until it is incident upon aperture mask 135. Mask 135 is mounted on translation stage 157. In an exemplary embodiment, stage 157 may be a Burley Inch Worm. In an alternative embodiment, stage 157 may move only in one direction (i.e. in either the X direction or the Y direction) or in both directions.

The exemplary translation stage 157 is controlled by a mask control signal, MC, provided by computer 151 which also controls shutter 110 so that the beam is not projected onto the work piece 155 when the mask or the work piece is being moved. In another embodiment, stage 157 may be controlled manually. Translation stage 157 is an adjustable stage with coarse and precision adjustable stages. Translation stage 157 adjusts the placement of aperture 135 in the optical path. In an exemplary embodiment, the width of laser beam 107 is about 4 mm and is incident upon aperture 135 which has an opening width of about 10 microns.

Aperture 135 masks a portion of laser beam 107 and creates sub-beam 137. Sub-beam 137 is reduced in size by the lenses 138 and 142 and is used to ablate work piece 155. Aperture 135, therefore, acts as a new starting location for the laser beam. As explained below, the combination of aperture 135, translation stage 157, and the lenses 138 and 142, minimizes wobble and allows for greater accuracy and pointing stability in focusing the laser beam upon work piece 155. After sub-beam 137 ablates work piece 155 in one location, shutter 110 closes, translation stage 157 moves aperture 135 to a different location, shutter 110 opens, and sub-beam 137 ablates work piece 155 in the new location.

Sub-beam 137 propagates along the optical path until it is incident upon lens 138. In an exemplary embodiment, lens 138 is a conventional lens used in laser systems with a longer focal length to focus sub-beam 137 toward work piece 155. In an exemplary embodiment, lens 138 has a 60 mm focal length. Sub-beam 137 propagates to sixth mirror 124. In an exemplary embodiment, sixth mirror 124 is a harmonic mirror that preferably reflects 387.5 nm wavelength light and allows light in the range less than 387.5 nm and in the range greater than 387.5 nm to pass through and out of laser drilling system 100. In another embodiment, sixth mirror 124 may be a conventional laser mirror that is highly reflective of at least 387.5 nm light.

Sixth mirror 124 redirects sub-beam 137 along the optical path where it is incident upon eighth mirror 127, a mirror that is highly reflective of at least 387.5 nm wavelength light. Eighth mirror 127 redirects sub-beam 137 along the optical path until it is incident upon 100× lens 142, which, in an exemplary embodiment, is a conventional magnifying lens used in laser systems with a shorter focal length. In an exemplary embodiment, 100× lens 142 is manufactured by Mitutuyo.

The combination of lens 138 and lens 142 provides the same function in this embodiment as the "eyepiece" lens 138 and the microscope objective lens 142 in the first embodiment. In an exemplary embodiment, 100× lens 142 has a 2 mm focal length and a 1 cm working distance. The exemplary embodiment may use an Ultra Long Working Distance Lens (ULWD) having a working distance of 1 cm as the lens 142. Alternatively, a conventional 2 mm lens may be used along with an air knife to remove any material that is ablated from the work piece.

The combination of lens 138 (focal length $f_1$=60 mm) and 100× lens 142 (focal length $f_2$=2 mm) creates a de-magnification of thirty ($f_1/f_2$) of sub-beam 137 upon work piece 155. Thus, the size of the image of the mask 135 on the work piece is $1/30^{th}$ the size of the image at the mask 135. This de-magnification of thirty means a reduced-size image of sub-beam 137 is moved one-thirtieth of the distance that aperture 135 is moved. In one example, therefore, when aperture 135 is moved 1 mm, sub-beam 137 moves 33 microns (1 mm/30=33 microns) along the surface of work piece 155. Another benefit of this de-magnification is that any translation errors made by translation stage 157 in moving aperture 135 are reduced by a factor of thirty when sub-beam 137 is incident upon work piece 155.

In the exemplary embodiment, an imaging system 143 is used to align the reduced-size image of sub-beam 137 with the target area of workpiece 155. Imaging system 143 may be used to ensure that the reduced-size image of sub-beam 137 is incident upon work piece 155 at the correct location. In an exemplary embodiment, imaging system 143 may include a charge-coupled device (CCD) array or other digital or analog camera. Imaging system 143 includes a display mechanism (not shown) allowing a system operator to determine where the reduced size image of sub-beam 137 should be incident upon work piece 155. Alternatively, image data provided by the imaging system may be received by the computer 151 and processed to implement the desired control functions.

Imaging system 143 is used in conjunction with light source 144 and other parts of laser drilling system 100. In an exemplary embodiment, light source 144 is a conventional incandescent light source capable of producing a well-focused spot of light. In the exemplary system, light from light source 144 and light from laser 105 are not transmitted simultaneously through laser drilling system 100. Before light source 144 is activated, shutter 110 is closed in order to prevent laser beam 107 from being transmitted through the system.

In an exemplary embodiment, light source 144 is a fiber guided light source which produces a spot of light with a 2 cm diameter. The spot of light generated by light source 144 travels along an optical path, through seventh mirror 126 and sixth mirror 124, until it is incident upon eighth mirror 127. As described above, sixth mirror 124 is a harmonic mirror and, so, passes incandescent light applied to its back surface. Seventh mirror 126 is a partially reflective mirror that allows a part of the incandescent light from light source 144 to pass through on one side and partly reflects incandescent light incident on the opposite side. In an exemplary embodiment, seventh mirror 126 may be a thin film pellicle. In another embodiment, seventh mirror 126 may be a low reflection pickoff mirror. In both exemplary embodiments, seventh mirror 126 reflects a few percent of the light from light source 144 while most of the light is transmitted through seventh mirror 126.

Eighth mirror 127 redirects the light from light source 144 along the optical path through 100× lens 142, where it is incident upon work piece 155. Work piece 155 reflects a portion of the incandescent light back along the optical path, through 100× lens 142 where the reflected light is incident upon eighth mirror 127. Eighth mirror 127 redirects the reflected incandescent light through sixth mirror 124 after which the incandescent light is incident upon seventh mirror 126. Seventh mirror 126 redirects the incandescent light so that it is incident upon imaging system 143. Imaging system 143 creates an image of the surface of work piece 155 in real time. The image created by imaging system 143 is transferred to computer 151. In an exemplary embodiment, computer 151 is a conventional computing means, such as a personal computer with a monitor (not shown) that may be used to display an image of the work piece generated by the imaging system 143.

In an exemplary embodiment, imaging system 143 is used to align the laser drilling system, using one or more test holes, and to measure the offset between the test hole and the target location along the waveguide of a photonic crystal. The term "offset" means the distance and angle between the practice hole(s) and the actual target location of laser drilling system 100. Either an operator or computer 151 directs the movement of aperture 135 through XY translation stage 157 to drill holes in work piece 155 based on the offset measurement derived from the image seen through imaging system 143. A support, translation stage 159, supports work piece 155 during ablation, and adjusts and maintains the position of work piece 155 in the focal plane of sub-beam 137 created by lens 138 and lens 142. Translation stage 159 is an XYZ translation stage. In an exemplary embodiment, it may be controlled by computer 151. In an alternative embodiment, it may be controlled manually. The translation stage 159 may also be used to change the position of the work piece between drilling the test hole and the actual photonic structure.

The method of operating laser drilling system 100 involves the following steps. First, XYZ translation stage 159, attached to work piece 155, is used to set the focus position of laser sub-beam 137 on work piece 155. The focus position in the Z direction is set by drilling several trial holes in the work piece and then viewing the trial holes through imaging system 143, with the laser beam being blocked by shutter 110. The practice area is an area that will not be included within the final product of work piece 155 and is used only for alignment purposes. When the operator observes through imaging system 143, good trial holes with correct measurements, the operator knows that the laser and work piece are in the proper relative focus positions.

Second, after the practice holes have been drilled properly, the operator or computer 151 determines the actual position of sub-beam 137 upon work piece 155 with imaging system 143. Third, translation stage 159 is adjusted in the X and/or Y directions to move the work piece position while holding the Z direction focus position. Fourth, better alignment between the reduced-size image of sub-beam 137 and the target area on work piece 155 may be accomplished by using imaging system 143 to measure the offset. Thus, once the offset has been determined, the reduced-size image of sub-beam 137 is aligned with the actual target area upon work piece 155 by moving aperture 135 via translation stage 157 as performed manually or as directed by computer 151. This is an alternative to using the stage 159 to move the work piece. This step is performed by having the system operator first look at the real time image of the practice hole produced by imaging system 143 showing the location of the position of the practice hole upon work piece 155. The system operator then adjusts the position of aperture 135 (and/or translation device 159) according to the direction and distance desired (as seen in the real time image) to align the reduced-size image of sub-beam 137 upon the target area of work piece 155. Using the holes drilled by the system, the patterns drilled can take the form of any shape. The holes forming the patterns may be arranged in parallel rows, parallel columns, or may be arranged in any format.

The fifth step is drilling the specified feature in the target area of work piece 155. Then, if the desired pattern in work piece 155 requires additional features to be drilled, aperture 135 is moved by the operator or computer 151 so that reduced-size sub beam 137 is at the next target area where drilling repeats. Movement of aperture 135 is done by controlling the movement of translation stage 157. During the machining of a feature on the work piece, only the mask 135 is moved. The method ends when the pattern is completed and the specified work piece geometry is drilled in work piece 155.

In an exemplary embodiment, the laser drilling system may form holes having a 200 nm diameter and a pitch (the distance between the centers of two adjacent holes) of 420 nm. In an alternative embodiment, the holes may have a 200 nm diameter and a 400 nm pitch.

Figure 3:
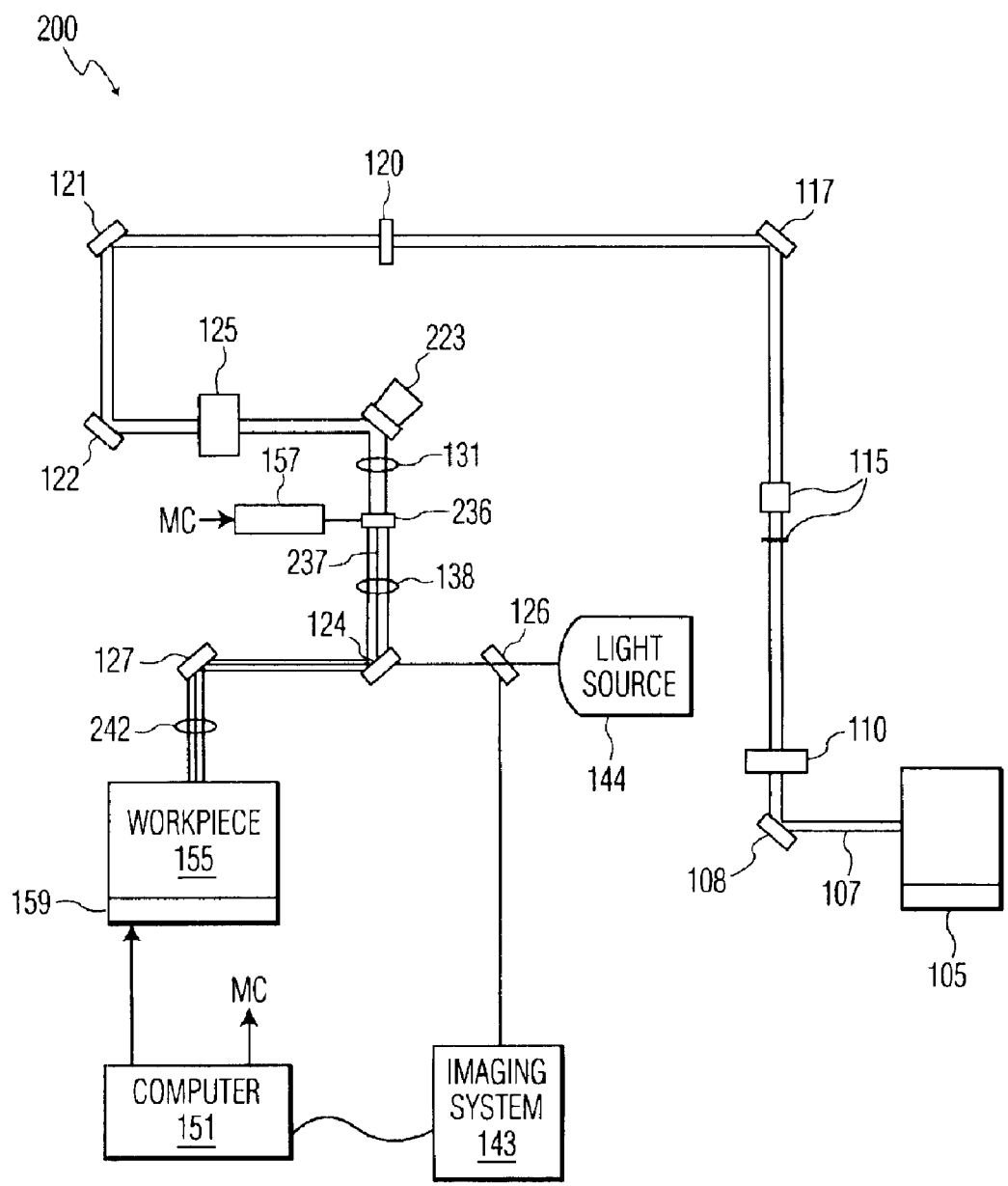
FIG. 3 is a block diagram of a third exemplary embodiment of the invention using a multiple aperture mask.

Referring to FIG. 3, a third exemplary embodiment is shown in which the same reference numbers refer to like elements. FIG. 3 shows a laser drilling system 200 which is a system for parallel processing precision holes in work piece 155. The majority of the elements of the laser drilling system shown in FIG. 3 are the same as those in the laser drilling system shown in FIG. 2, with the exception of multiple aperture mask 236 and sub-beams 237. As described below, the focal lengths of the lenses 138, 242 which demagnify sub beam 237 onto work piece 155, may be the same as, or different from, the focal lengths of those lenses shown in FIG. 2.

Multiple aperture mask 236 is fastened to adjustable translation stage 157. Multiple aperture mask 236 masks out much of the energy of beam 107 to create a plurality of sub-beams 237. The pattern of multiple aperture mask 236 is designed to provide a drilling pattern to ablate work piece 155. In an exemplary embodiment in which four holes are to be drilled along a waveguide to form a photonic crystal, the pattern of multiple aperture mask 236 may consist of a pattern of multiple holes thirty times larger than the desired pattern, due to the reduction in size provided by lens 138 and lens 242. In another exemplary embodiment, lens 242 has a magnification of 50×. In another embodiment, lens 242 is replaced with a lens having a 20× magnification. The combination of multiple aperture mask 236 and 50× lens 242 reduces the size of the original multi-hole mask by a factor equal to the focal length of lens 138 divided by the focal length of 50× lens 242 (f1/f2) while maintaining the exact pattern on the mask. In another embodiment, the focal length of lens 138 is 60 mm, the focal length of 50× lens 242 is 2 mm, and the demagnification is equal to 30. It will be understood that lenses 138 and 242 may have any power of magnification and any focal length that, in combination, will produce a desired demagnification. It will also be understood that a 1/30 demagnification is an example. Other demagnification may be used depending upon the task to be performed by the system. Whatever the demagnification may be, the aperture pattern of the mask 236 is imaged onto the work piece 155.

In operation, laser drilling system 200 in FIG. 3 is identical to laser drilling system 200 in FIG. 2, until laser beam 107 is incident upon fifth mirror 223. Fifth mirror 223 need not be a scanning mirror. It may, instead, be a conventional laser mirror. In either case, fifth mirror 223 redirects laser beam 107 along the optical path until it is incident upon lens 131. Lens 131 focuses laser beam 107 beyond multiple aperture mask 236 ensuring that the area is greater than the area of the multiple aperture pattern in the mask. Laser beam 107 passes through multiple aperture mask 236 which masks a portion of the beam. The part of beam 107 which is not masked by multiple aperture mask 236 becomes sub-beams 237. Sub-beams 237 propagate along the optical path and are incident upon lens 138 through which the beam propagates toward sixth mirror 124. Sixth mirror 124 redirects sub-beams 237 until they are incident upon eighth mirror 127. Eighth mirror 127 redirects sub-beams 237 along the optical path until they are incident upon lens 242 which focuses a reduced-size image of sub-beams 237, as it appears at the mask 236, upon work piece 155. Reduced-size sub-beams 237 ablate work piece 155 to form the desired features.

A very dense pattern of sub-micron holes (that is, holes that are located less than microns apart) may not be imaged using the embodiments described above due to resolution constraints of imaging system 143 as the feature sizes approach the wavelength of the laser beam, particularly when the feature sizes become equal to, or less than, the laser wavelength. The images of the features on the work piece become blurred when the features become so small. Blurring occurs because each laser beam has wave characteristics which permit the beam to be focused to a certain minimum spot size before hitting its limit. The limit, called the diffraction limit, is approximately equal to the wavelength of the laser beam.

Figure 4:
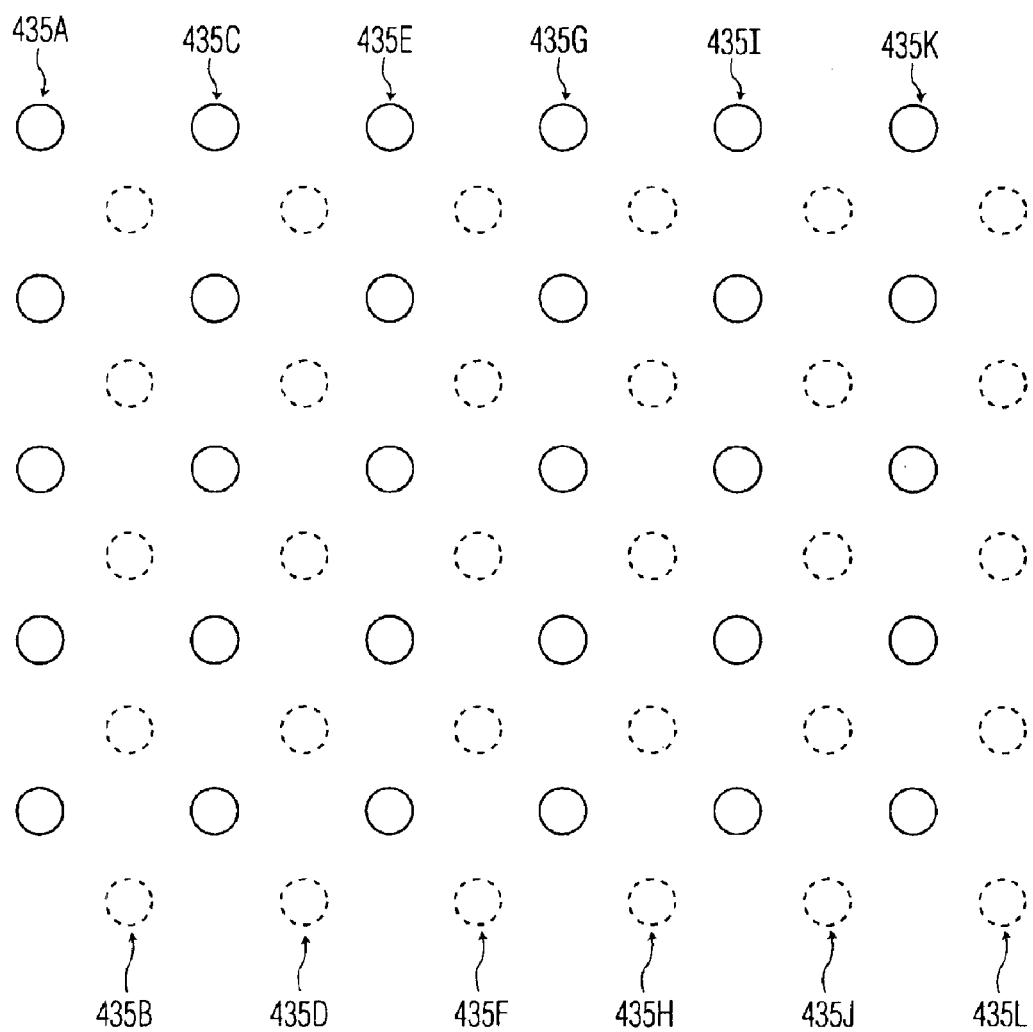
FIG. 4 is an image of a multiple aperture mask which shows the image in two different positions.

Blurring may cause problems with the precise alignment of reduced-size sub-beams 237 upon work piece 155. Therefore, in another embodiment, where a very dense pattern is desired in the final product, the laser drilling system 200 in FIG. 3 may use the same multiple aperture mask 236 more than once to form overlapping images on the work piece. This embodiment is illustrated in FIG. 4 which shows an exemplary mask 435 having a series of holes in columns 435A, 435C, 435E, 435G, 435I, and 435K. After a first set of holes is drilled in these columns, mask 236 is moved, resulting in the columns of holes being moved in the X and Y directions to new locations indicated by columns 435B, 435D, 435F, 435H, 435J, and 435L. The system may then drill a second set of holes at the new locations of the holes. It will be understood that the holes may be moved only in the X direction or only in the Y direction. Although FIG. 4 shows round holes as an exemplary embodiment, holes of other shapes may be drilled by the embodiment shown in FIG. 4 and by all of the embodiments of the invention.

In yet another embodiment where a very dense pattern is required in the final product, a multiple aperture mask 236 that is less dense may be used in combination with a second aperture mask 236. In this embodiment, holes may be first drilled using the first mask following by drilling holes using the second mask.

The method of operating laser drilling system 200 involves the following steps. In the first step, a practice set of shapes is drilled in a practice area of work piece 155. The practice area is an area that will not be included within the final product of work piece 155 and is used only for alignment purposes. In the second step, the actual position of the practice set of shapes upon the work piece is determined with imaging system 143. The third step is aligning reduced-size sub-beams 237 with the actual target area upon work piece 155 by moving mask 236. This step is performed when the system operator looks at the image of the practice set of shapes, produced by the imaging system 143 showing the location of the practice set of shapes upon work piece 155. The operator adjusts the position of multiple aperture mask 236 according to the direction and distance desired, as seen in the image of the practice set of shapes, to align reduced-size sub-beams 237 upon the target area of work piece 155. The fourth step is drilling a shape in the target area of work piece 155 where laser drilling system 200 generates reduced-size sub-beams 237, which ablate the target area of work piece 155 to meet specifications. Then, if the desired pattern in work piece 155 calls for an additional set of shapes to be drilled, mask 236 is moved to the next target area and drilling is repeated.

Using the embodiment shown in FIG. 3, the exemplary holes shown in FIG. 4 may have a diameter 200 nm and a pitch of 360 nm.

Although the invention has been described in terms of exemplary embodiments, it is contemplated that it may be practiced as described above with variations within the scope of the appended claims.

What is claimed:

1. A method for forming a plurality or features in a work piece with a laser comprising the steps of:

receiving a laser beam directed along an optical path;

directing the laser beam through a mask to create a sub-beam;

imaging the sub-beam onto the work piece through a lens system, the lens system having an absolute magnification of less than 1, to create a reduced-size image of the mask on the work piece at a first location, the reduced-size image exhibiting blurring due to diffraction limiting of the sub-beam;

forming a first feature of said plurality of features with said sub-beam at the first location;

moving the mask to move the reduced-size image of the mask to a second location an the work piece; and forming at least a second feature of said plurality of features at the second location wherein the first and second features are spaced close together such that the first and second features could not be made by a single mask in a single step due to the diffraction blurring in the reduced-size image.

2. The method of claim 1, further comprising the step of homogenizing the laser beam before it is directed through the mask.

3. The method of claim 1, the method further comprising the steps of viewing the first feature with an imaging system; and determining an offset between the feature at the first location and the second location;

wherein the step of moving the mask moves the sub-beam from the first feature in the first location to the second area of the work piece.

4. The method of claim 1 further comprising the step of decreasing the wavelength of the laser beam.

5. The method of claim 1, further comprising the step of attenuating the beam.

6. The method of claim 4 further comprising the step of preferably reflecting the beam with the decreased wavelength relative to the light at the wavelength of the laser.

7. The method of claim 4, further comprising the step of homogenizing the laser beam before it is directed through the mask.

8. The method of claim 4, further comprising the step of circularly polarizing the laser beam.

* * * * *